（12） United States Patent
Fouad et al.

(10) Patent No.: US 12,317,241 B2
(45) Date of Patent: May 27, 2025

(54) POWER-EFFICIENT RESOURCE SELECTION PROCEDURE FOR NR V2X UE WITH LIMITED POWER

(71) Applicant: Samsung Electronics Co., Ltd., Gyeonggi-do (KR)

(72) Inventors: Yaser Mohamed Mostafa Kamal Fouad, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 153 days.

(21) Appl. No.: 17/342,238

(22) Filed: Jun. 8, 2021

(65) Prior Publication Data

US 2022/0015099 A1 Jan. 13, 2022

Related U.S. Application Data

(60) Provisional application No. 63/171,376, filed on Apr. 6, 2021, provisional application No. 63/161,639, filed (Continued)

(51) Int. Cl.
*H04W 72/0453* (2023.01)
*H04W 4/40* (2018.01)
(Continued)

(52) U.S. Cl.
CPC ......... *H04W 72/0453* (2013.01); *H04W 4/40* (2018.02); *H04W 28/26* (2013.01);
(Continued)

(58) Field of Classification Search
None
See application file for complete search history.

(56) References Cited

U.S. PATENT DOCUMENTS 10,517,072 B2   12/2019   Patil et al.
10,834,641 B2   11/2020   Cai et al.
(Continued)

FOREIGN PATENT DOCUMENTS

WO   WO-2018027996 A1 *  2/2018 ........... H04L 5/0048
WO   2018/145067          8/2018
(Continued)

OTHER PUBLICATIONS

U.S. Appl. No. 62/907,010, Sarkis et al., filed Sep. 2019 (Year: 2019).*

(Continued)

*Primary Examiner* — Jay L Vogel
(74) *Attorney, Agent, or Firm* — The Farrell Law Firm, P.C.

(57) ABSTRACT

A UE apparatus is provided for NR V2X Mode 2 resource selection. The UE apparatus includes a transceiver; and a processor configured to identify a sensing window and a resource selection window, monitor for sidelink control information (SCI) transmitted by neighbor UEs in the sensing window, determine a resource for transmitting data in the resource selection window, and transmit, via the transceiver, data using the determined resource. The sensing window includes a mandated sensing duration for detection of aperiodic traffic prior to transmission by the transceiver.

20 Claims, 9 Drawing Sheets

Related U.S. Application Data on Mar. 16, 2021, provisional application No. 63/127,497, filed on Dec. 18, 2020, provisional application No. 63/089,762, filed on Oct. 9, 2020, provisional application No. 63/049,733, filed on Jul. 9, 2020.

(51) Int. Cl.

| | | |
|---|---|---|
| *H04W 28/26* | (2009.01) | |
| *H04W 52/02* | (2009.01) | |
| *H04W 72/02* | (2009.01) | |
| *H04W 72/0457* | (2023.01) | |
| *H04W 72/1263* | (2023.01) | |
| *H04W 72/25* | (2023.01) | |
| *H04W 72/52* | (2023.01) | |
| *H04W 72/541* | (2023.01) | |
| *H04W 72/542* | (2023.01) | |
| *H04W 72/543* | (2023.01) | |
| *H04W 72/566* | (2023.01) | |
| *H04W 74/0808* | (2024.01) | |
| *H04W 76/14* | (2018.01) | |
| *H04W 92/18* | (2009.01) | |

(52) U.S. Cl.
CPC ....... *H04W 52/0261* (2013.01); *H04W 72/02* (2013.01); *H04W 72/0457* (2023.01); *H04W 72/1263* (2013.01); *H04W 72/25* (2023.01); *H04W 72/541* (2023.01); *H04W 72/542* (2023.01); *H04W 72/543* (2023.01); *H04W 72/569* (2023.01); *H04W 74/0808* (2013.01); *H04W 76/14* (2018.02); *H04W 72/52* (2023.01); *H04W 92/18* (2013.01); *Y02D 30/70* (2020.08)

(56) References Cited

U.S. PATENT DOCUMENTS

| | | | |
|---|---|---|---|
| 2018/0279094 A1* | 9/2018 | Blasco Serrano | .... H04W 72/04 |
| 2020/0029245 A1 | 1/2020 | Khoryaev et al. | |
| 2020/0037358 A1 | 1/2020 | Chae et al. | |
| 2020/0229171 A1* | 7/2020 | Khoryaev | ............. H04W 72/54 |
| 2020/0396719 A1* | 12/2020 | Sheu | ..................... H04W 72/02 |
| 2021/0051526 A1 | 2/2021 | Cai et al. | |
| 2021/0099918 A1* | 4/2021 | Sarkis | ............... H04W 72/0453 |
| 2021/0227604 A1* | 7/2021 | Huang | .................. H04W 72/20 |
| 2021/0289391 A1* | 9/2021 | Paladugu | ............ H04L 47/2491 |
| 2021/0377956 A1* | 12/2021 | Lee | ..................... H04W 72/541 |
| 2021/0385694 A1* | 12/2021 | Freda | ................ H04W 74/0816 |
| 2021/0410129 A1* | 12/2021 | Freda | .................. H04W 72/543 |
| 2022/0124562 A1* | 4/2022 | Yu | .......................... H04W 72/20 |
| 2022/0353747 A1* | 11/2022 | Peng | ..................... H04L 1/1812 |
| 2023/0050353 A1* | 2/2023 | Miao | ................. H04W 72/1263 |
| 2023/0199728 A1* | 6/2023 | Yoshioka | .............. H04W 76/14 |
| | | | 370/329 |
| 2023/0217419 A1* | 7/2023 | Liu | ....................... H04W 72/04 |
| | | | 370/329 |

FOREIGN PATENT DOCUMENTS

| | | | | | |
|---|---|---|---|---|---|
| WO | WO-2018145067 A1 | * | 8/2018 | .......... | H04B 17/318 |
| WO | WO-2019184787 A1 | * | 10/2019 | ........ | H04W 28/0215 |
| WO | 2020/067760 | | 4/2020 | | |
| WO | WO-2020126657 A1 | * | 6/2020 | ........ | H04W 28/0231 |
| WO | WO-2021064135 A1 | * | 4/2021 | | |

OTHER PUBLICATIONS

Apple, "On Mode 2 Resource Allocation for NR Sidelink", R-1910962, 3GPP TSG RAN WG1 #98bis, Oct. 14-20, 2019, 5 pages.

Intel Corporation, "Design of Resource Allocation Mode-2 for NR V2X Sidelink Communication", R1-1912205, 3GPP TSG RAN WG1 Meeting #99, Nov. 18-22, 2019, 15 pages.

European Search Report dated Dec. 9, 2021 issued in counterpart application No. 21180024.8-1215, 12 pages.

RP-193231—3GPP TSG RAN Meeting #86 "New WID on NR sidelink enhancement", Dec. 9-12, 2019.

3GPP TS38.214: "NR; Physical layer procedures for data," Mar. 2020.

3GPP TS36.213: "Physical layer procedures," Mar. 2020.

Intel Corporation, "Resource Allocation Schemes for NR V2X Communication", R1-1902484, 3GPP TSG RAN WG1 Meeting #96, Feb. 25-Mar. 1, 2019, 17 pages.

European Search Report dated Jul. 15, 2024 issued in counterpart application No. 21180024.8-1215, 10 pages.

\* cited by examiner

POWER-EFFICIENT RESOURCE SELECTION PROCEDURE FOR NR V2X UE WITH LIMITED POWER

PRIORITY

This application is based on and claims priority under 35 U.S.C. § 119(e) to U.S. Provisional Patent Application Nos. 63/171,376, 63/161,639, 63/127,497, 63/089,762, and 63/049,733, which were filed in the United States Patent and Trademark Office on Apr. 6, 2021, Mar. 16, 2021, Dec. 18, 2020, Oct. 9, 2020, and Jul. 9, 2020, respectively, the entire content of each of which is incorporated herein by reference.

FIELD

The present disclosure relates generally to new radio (NR) vehicle-to-everything (V2X) enhancement, and more particularly, to Mode 2 resource selection for use by user equipments (UEs).

BACKGROUND

In NR V2X, Mode 2 resource selection can be used by UEs to select resources for transmission. In Mode 2, a UE establishes a sensing window and a resource selection window. In the sensing window, all UEs that are not transmitting are required to monitor all subchannels in order to detect sidelink control information (SCI) transmitted by their neighbors. Once SCI is detected, its reference signal received power (RSRP) is measured and a set of resources can be considered as occupied in future slots (within the resource selection window) based on the measurement. SCI can indicate up to two future resources (i.e., subchannels and slots) as well as a periodicity for periodic transmissions.

Subsequently, a sensing UE can identify a set of resources that are occupied in its resource selection window in order to avoid these resources. However, despite the advantages of this conventional procedure in reducing collisions (i.e., interference), it still requires each UE to continuously monitor all subchannels in order to identify the occupied resources, thus consuming large amounts of power.

While such high power consumption may be acceptable for vehicle UEs, which often have an abundant power source, it is not usually feasible for pedestrian UEs (PUEs), which have a limited power budget. For example, PUEs are expected to sleep for extended durations in order to preserve power and then wake up to perform a transmission, thus having limited or no sensing capability. Herein, the terms "PUE" and "limited-power UE" may be used interchangeably.

A similar behavior has been observed in long-term evolution (LTE), and consequently, the resource selection procedure therein was updated to include partial sensing and random resource selection in order to preserve power. However, despite the possible advantages of random resource selection and partial sensing for LTE, these methods offer limited protection against collisions between neighboring UEs. Consequently, they are not favorable for NR V2X applications, which are expected to require more strict reliability and latency requirements as compared to their LTE-based counterparts.

In addition, unlike LTE, NR PUEs are expected to receive messages from their neighboring UEs, and thus, are expected to be listening when other PUEs are transmitting. However, the PUEs are also expected to have limited sensing opportunities in order to preserve power.

Despite their simplicity, random resource selection and partial sensing can also penalize performance due to collisions; especially, if a PUE does not perform enough sensing to allow for pre-emption and resource reselection.

In addition, random resource selection and partial sensing may require a PUE to sense over a large bandwidth part (BWP), which may also increase power consumption.

Accordingly, a need exists for techniques that allow a UE to reduce its sensing duration, while still avoiding collisions with its neighboring UEs.

SUMMARY

Accordingly, the present disclosure is designed to address at least the problems and/or disadvantages described above and to provide at least the advantages described below.

An aspect of the disclosure is to provide techniques for improving Mode 2 resource selection of NR V2X to accommodate power saving UEs.

Another aspect of the disclosure is to provide techniques for UEs to use partial sensing and random resource selection in order to save their limited power, while still being able to avoid potential collisions with their neighboring UEs.

Another aspect of the disclosure is to provide a method for a PUE to perform an initial transmission on a limited subset of resources and to indicate limited power status in SCI.

Another aspect of the disclosure is to provide a pre-emption technique that reduces a power burden on power saving UEs.

Another aspect of the disclosure is to provide a technique that uses a mandated sensing duration to avoid collisions with aperiodic traffic.

In accordance with an aspect of the disclosure, a user equipment (UE) apparatus is provided. The UE apparatus includes a transceiver; and a processor configured identify a sensing window and a resource selection window, monitor for sidelink control information (SCI) transmitted by neighbor UEs in the sensing window, determine a resource for transmitting data in the resource selection window, and transmit, via the transceiver, data using the determined resource. The sensing window includes a mandated sensing duration for detection of aperiodic traffic prior to transmission by the transceiver.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
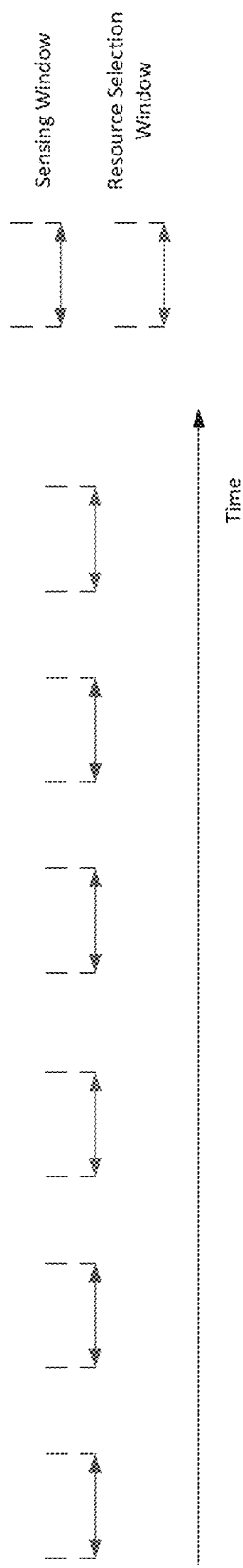
FIG. 1 illustrates a timeline providing an example of partial sensing.

Hereinafter, various embodiments of the disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc., may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to an embodiment may be one of various types of electronic devices. The electronic devices may include, for example, a portable communication device (e.g., a smart phone), a computer, a portable multimedia device, a portable medical device, a camera, a wearable device, or a home appliance. According to an embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, a module may be implemented in a form of an application-specific integrated circuit (ASIC).

FIG. 1 illustrates a timeline providing an example of partial sensing.

Unfortunately, these procedures are not currently adopted in NR V2X. Further, partial sensing was developed for LTE, which is dominated by periodic traffic, and thus not readily applicable for NR that can accommodate aperiodic traffic.

To address the drawbacks above, a work item (WI) discussion was initiated for NR V2X Rel-17 to make it more adaptable to power limited devices. In particular, the following WI was suggested in RAN meeting #86:

Resource allocation enhancement:
  Specify resource allocation to reduce power consumption of the UEs [RAN1, RAN2]
    Baseline is to introduce the principle of Rel-14 LTE sidelink random resource selection and partial sensing to Rel-16 NR sidelink resource allocation mode 2.
    Note: Taking Rel-14 as the baseline does not preclude introducing a new solution to reduce power consumption for the cases where the baseline cannot work properly.

1. Mode 2 Resource Allocation in NR Rel-16

In resource allocation Mode 2, a higher layer can request a UE to determine a subset of resources from which the higher layer will select resources for physical sidelink shared channel (PSSCH)/physical sidelink control channel (PSCCH) transmission. To trigger this procedure, in slot n, the higher layer provides the following parameters for this PSSCH/PSCCH transmission:

the resource pool from which the resources are to be reported;
  L1 priority, $prio_{TX}$;
  the remaining packet delay budget;

the number of sub-channels to be used for the PSSCH/PSCCH transmission in a slot, $L_{subCH}$; and optionally, the resource reservation interval, $P_{rsvp\_Tx}$, in units of ms.

The following higher layer parameters affect this procedure:

t2min_SelectionWindow: internal parameter $T_{2min}$ is set to the corresponding value from higher layer parameter t2min_SelectionWindow for the given value of $prio_{TX}$.

SL-ThresRSRP_pi_pj: this higher layer parameter provides an RSRP threshold for each combination $(p_i, p_j)$, where $p_i$ is a value of the priority field in a received SCI format 0-1 and $p_j$ is a priority of the transmission of the UE selecting resources; for a given invocation of this procedure, $p_j = prio_{TX}$.

RSforSensing selects if the UE uses the PSSCH-RSRP or PSCCH-RSRP measurement, as defined in subclause 8.4.2.1.

reservationPeriodAllowed t0_SensingWindow: internal parameter $T_0$ is defined as the number of slots corresponding to t0_SensingWindow ms.

The resource reservation interval, $P_{rsvp\_TX}$, if provided, is converted from units of ms to units of logical slots, resulting in $P'_{rsvp\_TX}$, and $(t_0^{SL}, t_1^{SL}, t_2^{SL}, \ldots)$ denotes the set of slots which can belong to a sidelink resource pool.

Figure 2:
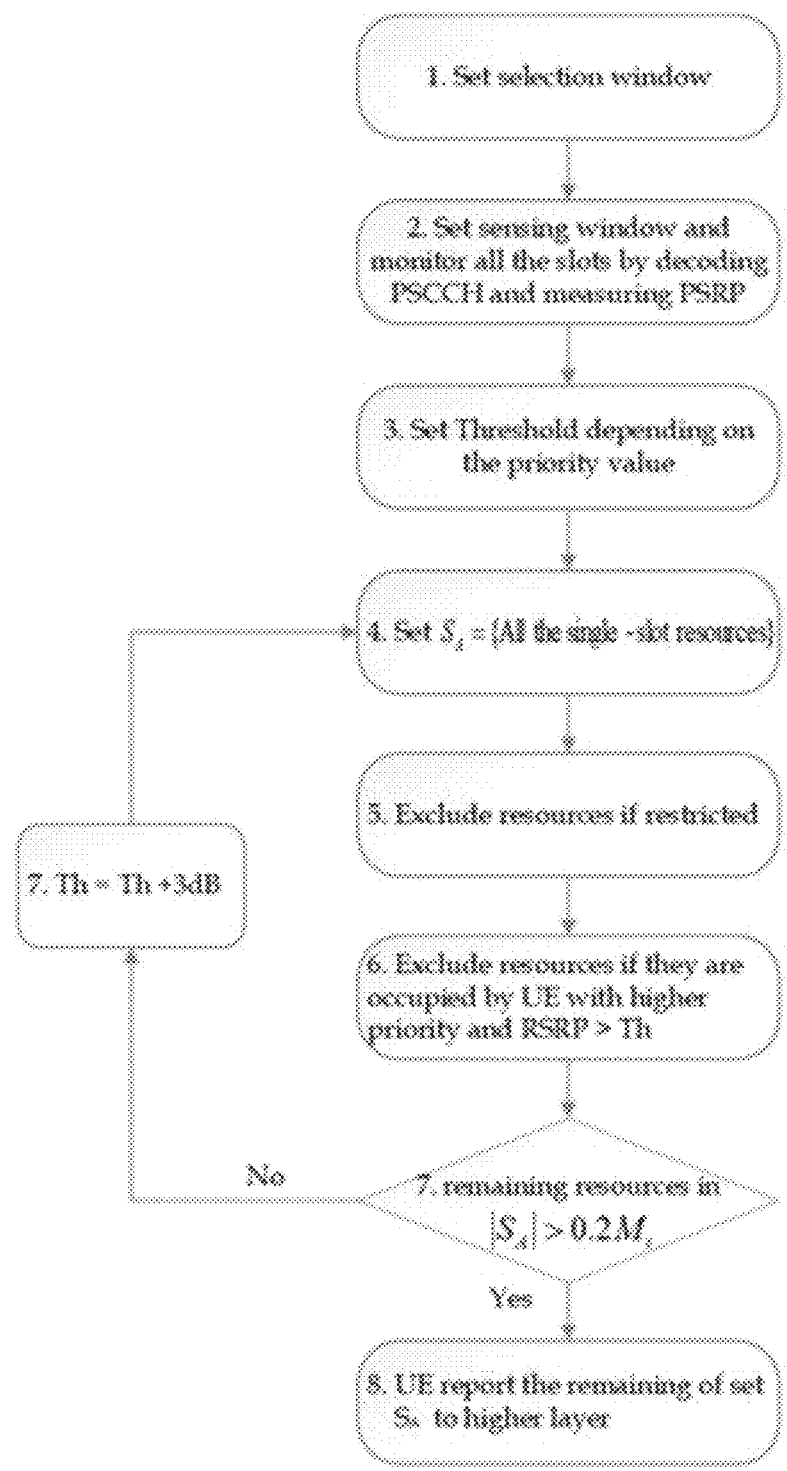
FIG. 2 is flowchart illustrating a Mode 2 resource selection procedure.

FIG. 2 is flowchart illustrating a Mode 2 resource selection procedure.

Referring to FIG. 2:

Step 1. A candidate single-slot resource for transmission $R_{x,y}$ is defined as a set of $L_{subCH}$ contiguous sub-channels with sub-channel $x+j$ in slot $t_y^{SL}$, where $j=0, \ldots, L_{subCH}-1$. The UE shall assume that any set of $L_{subCH}$ contiguous sub-channels included in the corresponding resource pool within the time interval $[n+T_1, n+T_2]$ correspond to one candidate single-slot resource, where selection of $T_1$ is up to UE implementation under $0 \leq T_1 \leq T_{proc,1}$, where $T_{proc,1}$ is TBD; If $T_{2min}$ is shorter than the remaining packet delay budget (in slots) then $T_2$ is up to UE implementation subject to $T_{2min} \leq T_2 \leq$ remaining packet budget (in slots); otherwise $T_2$ is set to the total remaining packet delay budget (in slots). The total number of candidate single-slot resources is denoted by $M_{total}$.

Step 2. The sensing window is defined by the range of slots $[n-T_0, n-T_{proc,0})$, where $T_0$ is defined above and $T_{proc,0}$ is TBD. The UE shall monitor slots which can belong to a sidelink resource pool within the sensing window except for those in which its own transmissions occur. The UE shall perform the behavior in the following steps based on the decoded PSCCH and the measured RSRP in these slots.

Step 3. The internal parameter $Th(p_i)$ is set to the corresponding value from higher layer parameter SL-ThresRSRP_pi_pj for $p_j$ equal to the given value of $prio_{Tx}$ and each priority value $p_i$.

Step 4. The set $S_A$ is initialized to the set of all the candidate single-slot resources.

Step 5. The UE shall exclude any candidate single-slot resource $R_{x,y}$ from the set $S_A$ if it meets all the following conditions:
 a. The UE has not monitored slot $t_m^{SL}$ in Step 2.
 b. For any periodicity value allowed by the higher layer parameter reservationPeriodAllowed and a hypothetical SCI format 0-1 received in slot $t_m^{SL}$ with "Resource reservation period" field set to that periodicity value and indicating all subchannels of the resource pool in this slot, condition c in Step 6 would be met.

Step 6. The UE shall exclude any candidate single-slot resource $R_{x,y}$ from the set $S_A$ if it meets all the following conditions:
 a. the UE receives an SCI format 0-1 in slot $t_m^{SL}$, and "Resource reservation period" field, if present, and "Priority" field in the received SCI format 0-1 indicate the values $P_{rsvp\_RX}$ and $prio_{RX}$, respectively;
 b. the RSRP measurement performed, according to received SCI format 0-1, is higher than $Th(prio_{RX})$;
 c. the SCI format received in slot $t_m^{SL}$ or the same SCI format which, if and only if the "Resource reservation period" field is present in the received SCI format 0-1, is assumed to be received in slot(s) $t_{m+q \times P'rsvp\_RX}^{SL}$ determines the set of resource blocks and slots which overlaps with $R_{x,y+j \times P'rsvp\_TX}$ for $q=1, 2, \ldots, Q$ and $j=0, 1, \ldots, C_{resel}-1$. Here, $P'_{rsvp\_RX}$ is $P_{rsvp\_RX}$ converted to units of logical slots, $$Q = \left\lceil \frac{T_{scal}}{P_{rsvp\_RX}} \right\rceil$$

if $P_{rsvp\_RX} < T_{scal}$ and $n'-m \leq P'_{rspv\_RX}$, where $t_{n'}^{SL}=n$ if slot n belongs to the set $(t_0^{SL}, t_1^{SL}, \ldots, t_{Tmax}^{SL})$, otherwise slot $t_{n'}^{SL}$ is the first slot after slot n belonging to the set $(t_0^{SL}, t_1^{SL}, \ldots, t_{Tmax}^{SL})$; otherwise $Q=1$. $T_{scal}$ is TBD.

Step 7. If the number of candidate single-slot resources remaining in the set $S_A$ is smaller than $0.2 \cdot M_{total}$, then $Th(p_i)$ is increased by 3 dB for each priority value $Th(p_i)$ and the procedure continues with Step 4.

Step 8. UE shall report remaining of set $S_A$ to higher layers, and high layer then randomly selects a candidate resource for transmission.

2. Partial-Sensing/Random Based Mode 2 Resource Selection Procedure in LTE V2X

If partial sensing is configured by higher layers then the following steps are used:

1) A candidate single-subframe resource for PSSCH transmission $R_{x,y}$ is defined as a set of $L_{subCH}$ contiguous sub-channels with sub-channel $x+j$ in subframe $t_y^{SL}$, where $j=0, \ldots, L_{subCH}-1$. The UE shall determine by its implementation a set of subframes which consists of at least Y subframes within the time interval $[n+T_1, n+T_2]$, where selections of $T_1$ and $T_2$ are up to UE implementations under $T_1 \leq 4$ and $T_{2min}(prio_{TX}) \leq T_2 \leq 100$, if $T_{2max}(prio_{TX})$ is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$, if k-th bit of the high layer parameter gapCandidateSensing is set to 1. The UE shall perform the behavior in the following steps based on PSCCH decoded and S-received signal strength indication (RSSI) measured in these subframes.

3) The parameter $Th_{a,b}$ is set to the value indicated by the i-th SL-ThresPSSCH-RSRP field in SL-ThresPSSCH-RSRP-List where i=a*8+b+1.
4) The set $S_A$ is initialized to the union of all the candidate single-subframe resources. The set $S_B$ is initialized to an empty set.
5) The UE shall exclude any candidate single-subframe resource $R_{x,y}$ from the set $S_A$ if it meets all the following conditions:
   1.—the UE receives an SCI format 1 in subframe $t_m^{SL}$, and "Resource reservation" field and "Priority" field in the received SCI format 1 indicate the values $P_{rsvp\_RP}$ and $prio_{RX}$, respectively according to Sub-clause 14.2.1.
   2.—PSSCH-RSRP measurement according to the received SCI format 1 is higher than $Th_{prio_{TX},prio_{RX}}$.
   3.—the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P'_{rsvp\_TX}}$ for q=1, 2, ..., Q and j=0, 1, ..., $C_{resel}$−1. Here, $$Q = \frac{1}{P_{rsvp\_RX}}$$

if $P_{rsvp\_RX}$<1 and y'−m≤$P_{step} \times P_{rsvp\_RX}+P_{step}$, where $t_{y'}^{SL}$ is the last subframe of the Y subframes, and Q=1 otherwise.
6) If the number of candidate single-subframe resources remaining in the set $S_A$ is smaller than 0.2·$M_{total}$, then Step 4 is repeated with $Th_{a,b}$ increased by 3 dB.
7) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}$−1 in the monitored subframes in Step 2 that can be expressed by $t_{y-P_{step}*j}^{SL}$ for a non-negative integer j.
8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.
9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time. The UE shall report set $S_B$ to higher layers.

When transmission based on random selection is configured by upper layers and the UE is configured by upper layers to transmit using resource pools on multiple carriers, the following steps are used:
1) A candidate single-subframe resource for PSSCH transmission $R_{x,y}$ is defined as a set of $L_{subCH}$ contiguous sub-channels with sub-channel x+j in subframe $t_y^{SL}$, where j=0, ..., $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1$≤4 and $TTX_{2min}$, if $TTX_{2min}$ is provided by higher layers for $prio_{Tx}$, otherwise 20≤$T_2$≤100. UE selection of $T_2$ shall fulfil the latency requirement. The total number of the candidate single-subframe resources is denoted by $M_{total}$.
2) The set $S_A$ is initialized to the union of all the candidate single-subframe resources. The set $S_B$ is initialized to an empty set.
3) The UE moves the candidate single-subframe resource $R_{x,y}$ from the set $S_A$ to $S_B$.
4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time. The UE shall report set $S_B$ to higher layers.

Pre-Emption Procedure Enhancements for Partial Sensing UEs

In accordance with an embodiment of the disclosure, UEs with limited power budgets may perform special periodic resource reservations. In particular, each UE will perform 2 or more resource reservations in each period, whereby the two resources are separated by either T or T+n slots. T is the minimum time required by the UE to process a pre-emption request and relinquish the signaled resources.

Figure 3:
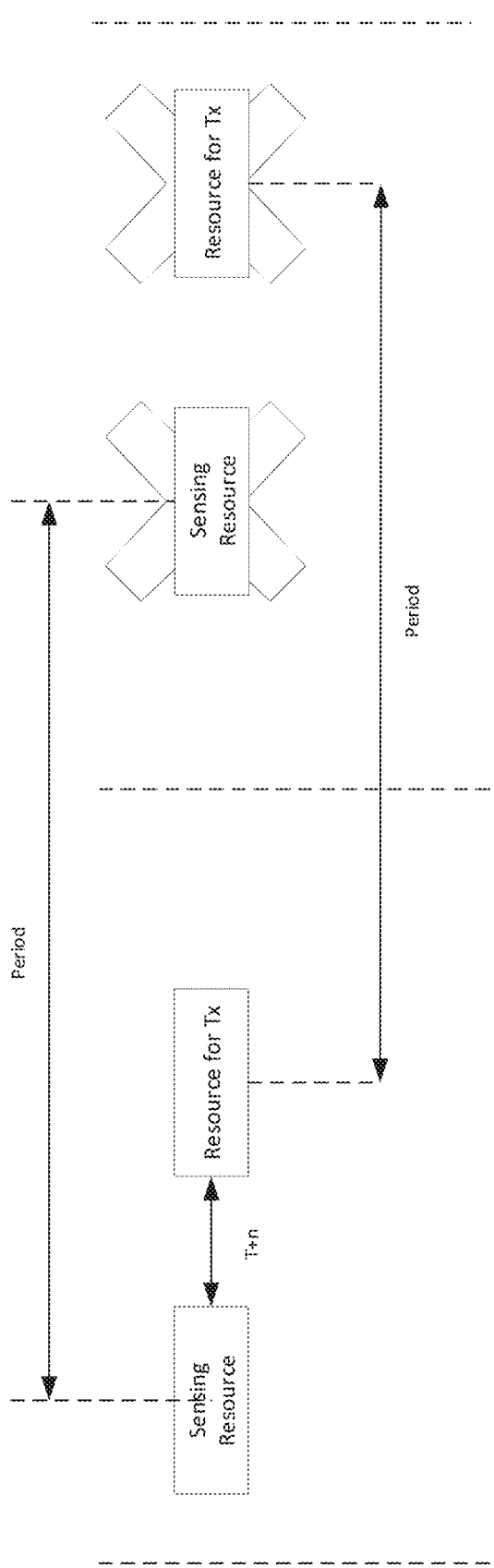
FIG. 3 illustrates periodic reservations for sensing and transmission, according to an embodiment.

FIG. 3 illustrates periodic reservations for sensing and transmission, according to an embodiment.

Referring to FIG. 3, "sensing resource" represent the resources used to monitor for pre-emption by PUEs, and "resource for Tx" represents resources used for transmission by the PUEs.

Two scenarios can be considered in this case:

Scenario 1: A power-limited UE always performs the periodic reservation, irrespective of the existence of data to transmit or not. In this scenario, the PUE can perform periodic reservations at extended periods in order not to waste too many resources. In addition, if delay tolerant traffic arrives, it can be delayed until the next transmission occasion.

Scenario 2: The power-limited UE can only start these periodic reservations when it has traffic (either periodic or aperiodic). In this case, on each occasion, the UE wakes up to transmit the pending data. The periodicity of the resource reservation does not need to match that of the incoming traffic. In particular, if the incoming TBs are delay tolerant, then the resource reservation periodicity does not need to be equal to the traffic periodicity. However, if the traffic is not delay tolerant, the periodicity of the resource reservation may be selected to match that of the periodic traffic. If the incoming TB is larger than the periodically reserved resources (e.g., if a limited number of subchannels are reserved per period to reduce the potential for collisions), the PUE can also reserve additional resources in its SCI to carry the remaining payload. These reservations can be either random or based on partial sensing.

As illustrated in FIG. 3, in a first resource reservation, the PUE does not transmit, but instead senses the subchannel(s)

for SCI (i.e., the resources for neighboring UEs to use). If SCI of a neighboring UE is detected that indicates that the upcoming resource is reserved, then the limited-power UE assumes that the second reservation is pre-empted and does not perform a transmission. Here, a restriction can be imposed on the system in terms of pre-emption.

In particular, a UE that requires to pre-empt the power-limited UE will have to send its SCI in the first resource(s). This can be done by indicating that these periodic reservations are done by power-limited UEs and that the first one or more resource in each interval is reserved for sensing. This indication can be done in the SCI, either explicitly with a flag or implicitly by setting a set of parameters to specific values. The pre-emption of resources in each interval can also be based on specific thresholds. For example, the limited power UE will not pre-empt (or relinquish the selected resource) unless the UE performing the pre-emption has an RSRP above a threshold based on priority. This threshold can also be different from normal pre-emption thresholds.

In addition, the UE performing the pre-emption can reduce the probability by which these resources are selected by the higher layer. In particular, when passing the candidate set of resources to the higher layers, the UE can provide two subsets. A first subset has a lower probability and includes resources pre-reserved by power-limited UEs and a second subset has a higher probability and includes the remaining resources which are available for selection. A potential issue with this embodiment is how to recover the periodic reservations if one of the transmissions either fails or is pre-empted.

In addition, another issue is how to maintain the reservation of the resources dedicated for sensing since no SCI transmissions will occur in these occasions.

These issues can be resolved by one or more of the following techniques:
  a. A new periodic reservation can be done when one of the reservations for TB transmission is pre-empted.
  b. If indication of past resources, similar to LTE, is possible, then a UE can indicate in the transmitted SCI the resources used for sensing. In this case, such periodic resources can be preserved.
  c. An indication is included in SCI for the special periodic reservation by power-limited UEs. Subsequently, this can be used to infer that all the indicated resources will be reserved in each interval if any transmission occurs. In particular, the power-limited UE does not perform any transmission in the sensing resource. However, if a transmission occurs on the reserved resource, this may indicate that the periodic reservation holds in subsequent periods. Alternatively, the UE can be assumed to hold the periodic reservation at least X periods after the last transmission. Further, a UE can be assumed to maintain the periodic reservations for Y periods after the first indication irrespective of the number of transmissions. The UE behavior in the initial transmission can be different from subsequent ones. In particular, the UE may perform full sensing before initially accessing the resources. In addition, the UE may use the first resource(s) (i.e., the sensing resource) to send SCI to indicate the periodic reservation of the sensing and transmission resources, if backward indication is not allowed.
  d. Pre-emption is expected to be sensed by neighboring UEs of the power limited UEs. In this case, if one interval is pre-empted, then the power-limited UE can be expected to return to periodic transmissions in following periods.
  e. Since a special reservation is described above, whereby the initial transmissions(s) within each period are only used for sensing, a flag is used to indicate this behavior. This can be done either explicitly with a dedicated flag or implicitly by setting a few fields in SCI to preselected values. Subsequently, the resource reservation indicated by the SCI can be assumed to point backwards to the sensing resource (i.e., allowing backward indication similar to LTE only for this special resource reservation). For example, SCI received at slot X with a separation set to T between sensing and Tx resource and a period P would indicate that the sensing resource is located at slot X-T and that this sensing resource is also reserved periodically with period P.
  f. A power-limited UE may perform period-by-period reservation in order to extend its signaling window. In particular, in each SCI, the UE uses the period field in the $1^{st}$ stage SCI to indicate a shift of its signaling window. This is in addition to time-frequency allocation of one or more resource reservation. For example, at slot n, a UE provides a shift equivalent to 100 slots (using the period field) and indicates that two resources are reserved with separation equal to Z. In this case, the future reserved resources would be n+100 for the sensing resource and n+100+Z for the Tx resource which will be used to perform the transmission.

Figure 4:
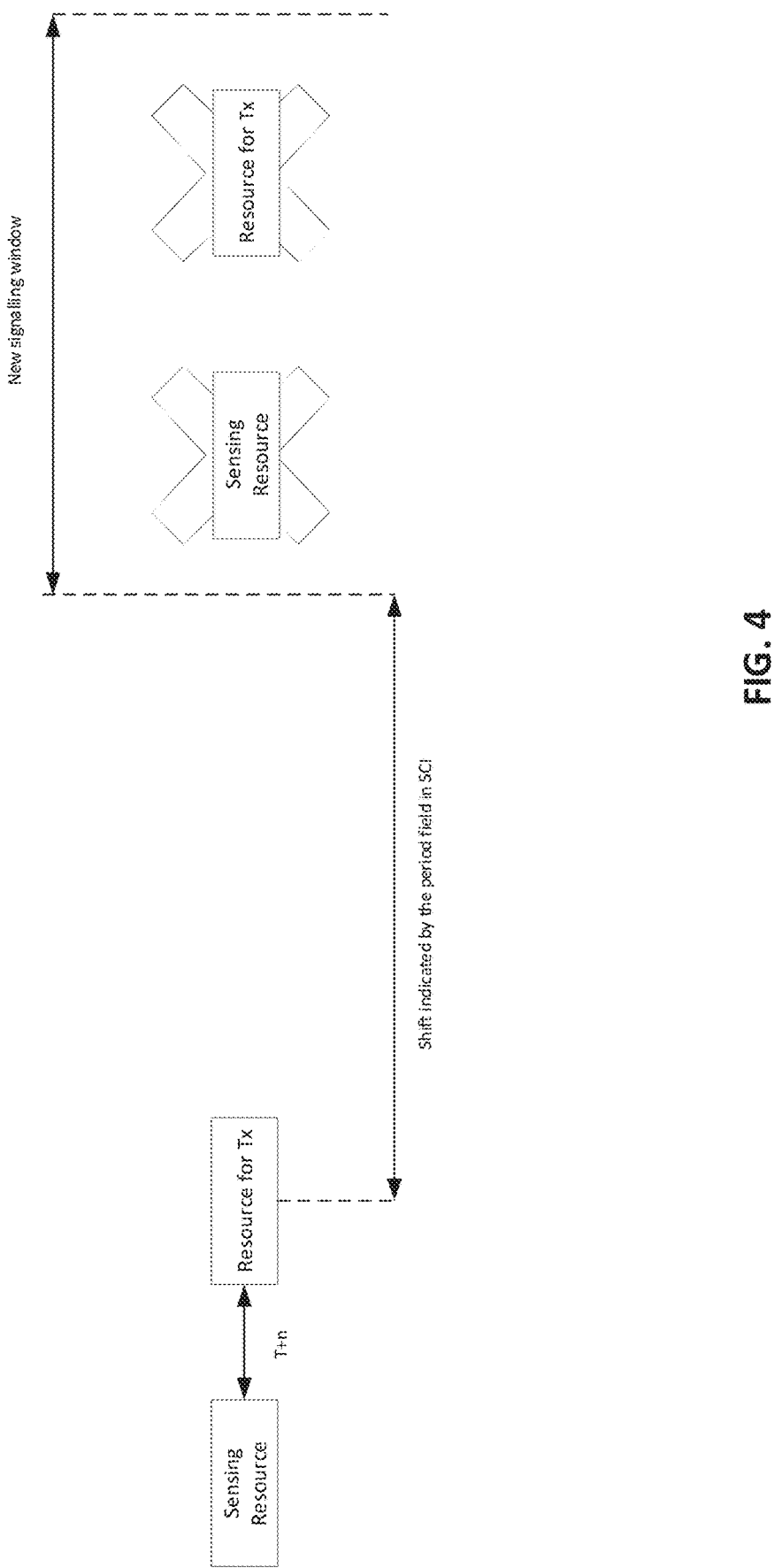
FIG. 4 illustrates periodic reservations for sensing and transmission, according to an embodiment.

FIG. 4 illustrates periodic reservations for sensing and transmission, according to an embodiment.

Referring to FIG. 4, in case of a pre-emption, the UE relinquishes the resource reserved for Tx, and thus a new reservation can be done, as described above, wherein the UE uses the period field in the 1 st stage SCI to indicate a shift of its signaling window.

A power-limited UE is not limited to only one transmission per period. In particular, the resources required to transmit the incoming traffic might not be sufficient to carry the data to be transmitted. In this case, the power-limited UE may:
  a. Stop the periodic transmissions and reserve additional resources.
  b. Maintain the periodic transmission but reserve additional aperiodic resources to carry the remaining data.
  c. Adjust the period of periodic transmissions so that more data can be carried.

As described above, in accordance with an embodiment of the disclosure, a UE with a limited power budget may perform periodic resource reservation, whereby in each resource reservation, two or more resources are selected such that they have at least T (or T+n) slots of separation. The power-limited UE monitors for pre-emption requests in the first reserved resource and determines whether to transmit or not in the second resource. The power-limited UE can relinquish the second resource when a reservation by a neighboring UE is detected with an RSRP that is above a certain threshold based on priority.

Further, in accordance with an embodiment of the disclosure, to reduce the number of pre-emptions, a UE performing pre-emption can pass candidate resources for selection to higher layers in two subsets. A first subset has a lower probability and includes resources that require preemption, and a second subset has higher probability and includes available resources.

Reduced Resource Reservations for Collision Reduction

To address some of the issues with Mode 2 resource selection, an initial transmission is separated from subsequent transmissions. More specifically, if a UE wakes up with data to send, it begins by reserving a limited number of subchannels (e.g., one subchannel). That is, reservation is performed irrespective of the payload size because the chances of colliding with neighboring UEs is generally reduced if a UE attempts to access only a limited number of subchannels.

Figure 5:
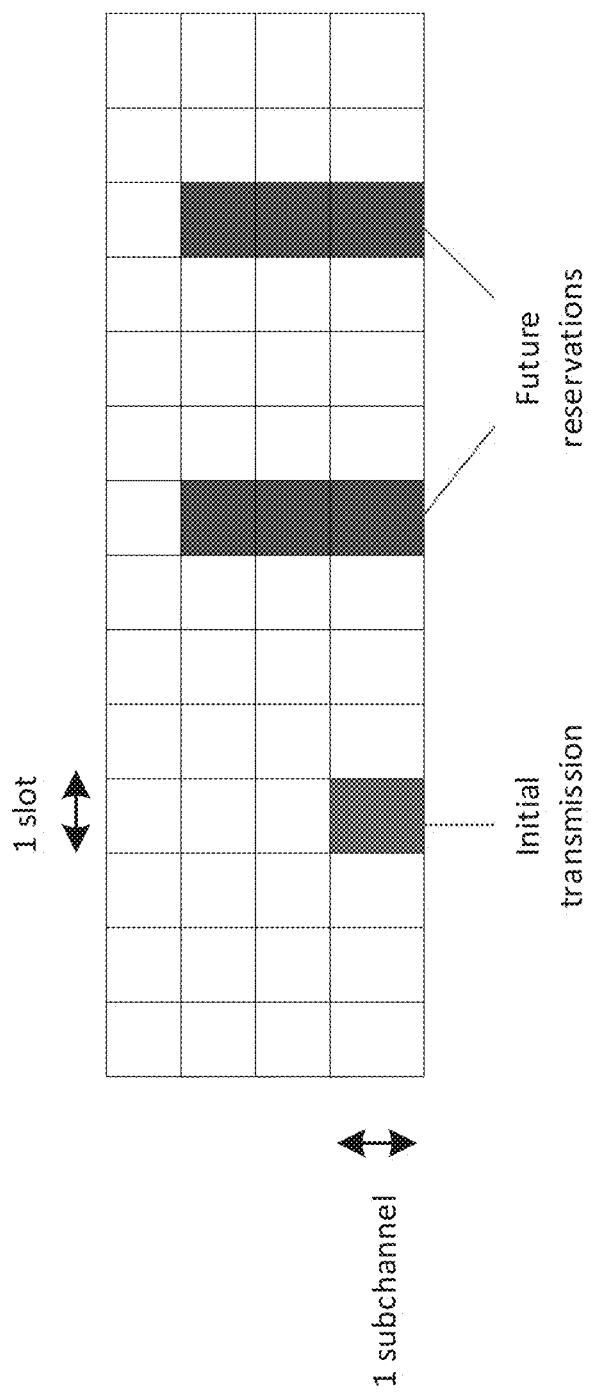
FIG. 5 illustrates a reduced subchannel reservation for an initial transmission, according to an embodiment.

FIG. 5 illustrates a reduced subchannel reservation for an initial transmission, according to an embodiment.

Referring to FIG. 5, the number of accessible subchannels in the initial transmission is limited to 1 subchannel instead of 3 subchannels as used in the future reservations, in order to reduce the chances of collisions. For example, a flag in SCI may be used to indicate a difference in the number of subchannels.

In addition to transmitting a partial or no payload (due to the limited number of selected subchannels), the UE can also transmit SCI including:

a. A 1-bit flag to indicate that this is a single subchannel allocation, which can be different from subsequent allocations. The limited subchannel reservation may be done only to the initial resource reservation by the UE after a non-sensing duration. In particular, once the UE wakes up from a sleeping duration in which it was not performing sensing, e.g., to preserve power, the UE uses a reduced subchannel reservation (i.e., one subchannel) for its initial TB transmission. However, subsequent transmissions can occupy any number of subchannels, irrespective of the size of the first one. If the UE decides to perform more than one TB transmissions before going back to sleep, then there may not be a need to restrict the initial transmissions of subsequent TBs to one subchannel given that either sufficient sensing was performed during the wake up duration or the resources for the new TB transmission were already reserved by previous ones (e.g., periodic transmissions).

b. Future resource reservations to carry the remaining data or subsequent transmissions/retransmissions. Future reservations can occupy any number of subchannels irrespective of the initial transmission. Hence, a subchannel size field in SCI can refer to future reservations rather than an initial reservation.

c. A flag indicating blind/partial-sensing based transmission, which allows colliding UEs to yield future reserved resources to avoid collisions, irrespective of their priorities. In particular, the future reserved resources by the power-limited UE may collide with either selected or already signaled resource reservations of other UEs. In some scenarios, these UEs will have higher priority traffic. Since the limited-power UE either does not perform sensing or performs limited sensing, it is likely that it is not aware of the resource reservations of other UEs. Subsequently, collisions can occur, rendering the resources at which collisions occur non-beneficial due to interference. To avoid this, a neighboring UE can determine to reselect a different resource, if available. In particular, the neighboring UE can measure the RSRP of the SCI sent by the limited-power UE and accordingly estimate the interference on the upcoming conflicting resource. If the estimated interference is above a certain threshold, the neighboring UE can decide to relinquish the resource and utilize a different one, irrespective of priority levels. This is unlike the resource reselection and pre-emption procedures of NR V2X Rel-16, which necessitate that a UE relinquishes its selected or signaled resources only if the colliding UE has higher priority traffic. To allow this pre-emption and resource reselection, the future reserved resources by the limited-power UE can be restricted to be at least T slots away from the current transmission, where T is the minimum time required to process a reselection/pre-emption request. That is, the neighboring UE will require at least T slots to perform pre-emption/reselection in order to avoid the potential collision. In addition, it may be required that the separation between the current slot and the upcoming resource reservation by the limited-power UE is greater than T+n slots. Subsequently, the limited-power UE should perform sensing in the n slots in order to allow UEs with higher priority traffic to indicate a pre-emption and prevent the limited-power UE from performing its transmission in order to avoid possible collision.

In accordance with an embodiment of the disclosure, for UEs that do not perform continuous sensing (i.e., power-limited UEs), initial transmissions are restricted to a limited number of subchannels (e.g., 1 subchannel) in order to reduce the chances of collision.

As described above, in accordance with an embodiment of the disclosure, SCI transmitted by a power-limited UE may include a flag to indicate that an initial transmission uses a limited number of resources, unlike subsequent reservations. For example, this type of indication of the PUE status in SCI may be useful for collisions avoidance with full sensing UEs. Full sensing UEs can avoid pre-empting PUEs due to their limited sensing capability irrespective of priority/RSRP. Further, full sensing UEs can perform resource re-selection irrespective of priority/RSRP threshold or when RSRP is above a threshold.

Figure 6:
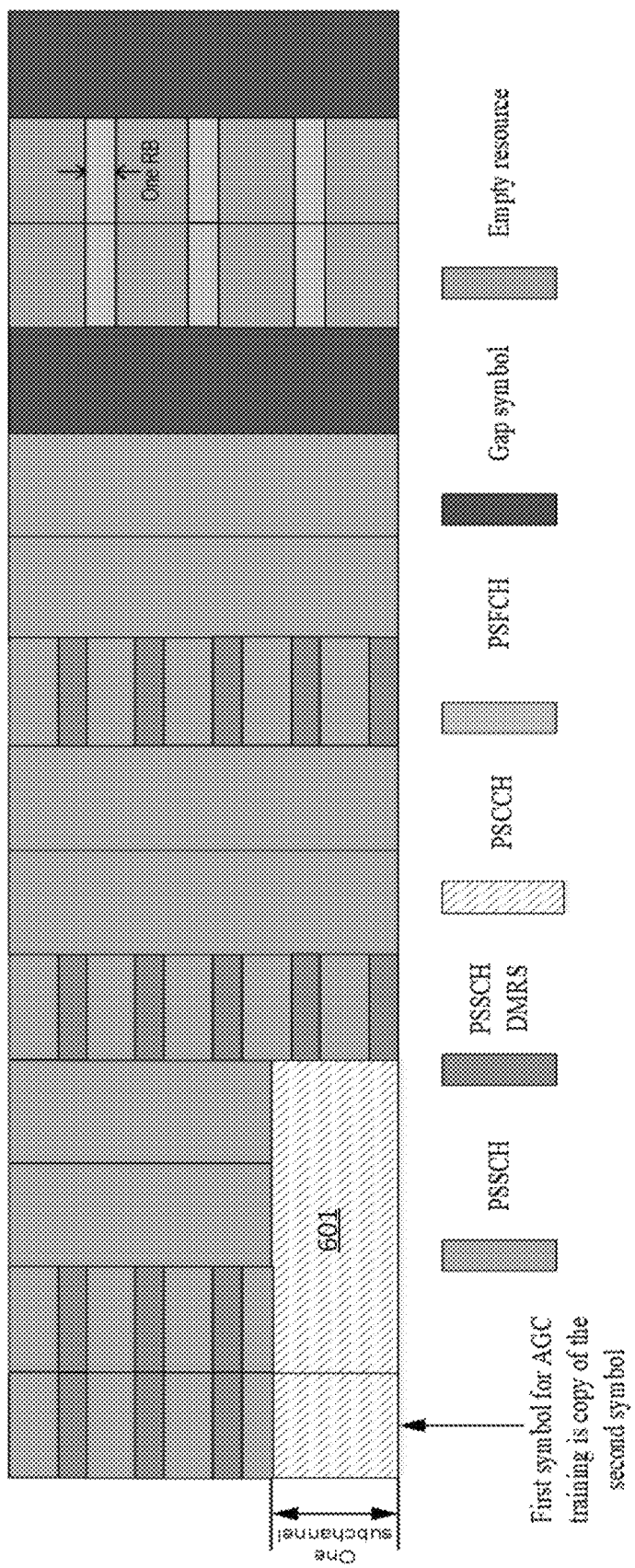
FIG. 6 illustrates SCI transmission by a UE, according to an embodiment.

FIG. 6 illustrates SCI transmission by a UE according to an embodiment.

Referring to FIG. 6, the PSSCH 601 includes an indication in SCI of power limited status by a PUE in order to reduce the chances of pre-emption by full sensing UEs, irrespective of priority.

In accordance with an embodiment of the disclosure, SCI transmitted by a power-limited UE may indicate blind/partial sensing situation. Neighboring UEs expecting a conflict on future selected/signaled resources can accordingly reselect their resources in order to avoid potential collisions, irrespective of their priorities. This avoidance can also occur only if the measured RSRP of the SCI sent by the power limited UE is above a fixed/pre-configured threshold.

Mandated Sensing for Collision Avoidance with Aperiodic Traffic

A power-limited UE may be required to perform sensing for a duration equal to the signaling window before attempting to access the subchannels. Such sensing can help identify the aperiodic traffic, thus limiting the chances of collisions to UEs with aperiodic reservations. Although this sensing will consume power, the amount of consumed power is marginal when compared to the sensing window. For example, the NR Rel-16 sensing window is currently between 100-1100 ms, whereas the signaling window is only 32 slots. This duration can be also shortened/extended based on a traffic priority. For example, a higher priority traffic that has a stringent delay requirement can be allowed to transmit earlier in order to meet the packet delay budget (PDB).

In accordance with an embodiment of the disclosure, for UEs that do not perform continuous sensing due to limited power budget, a sensing duration may be mandated to be at least equal to the signaling window before initial transmission, if PDB≥the signaling window.

Figure 7:
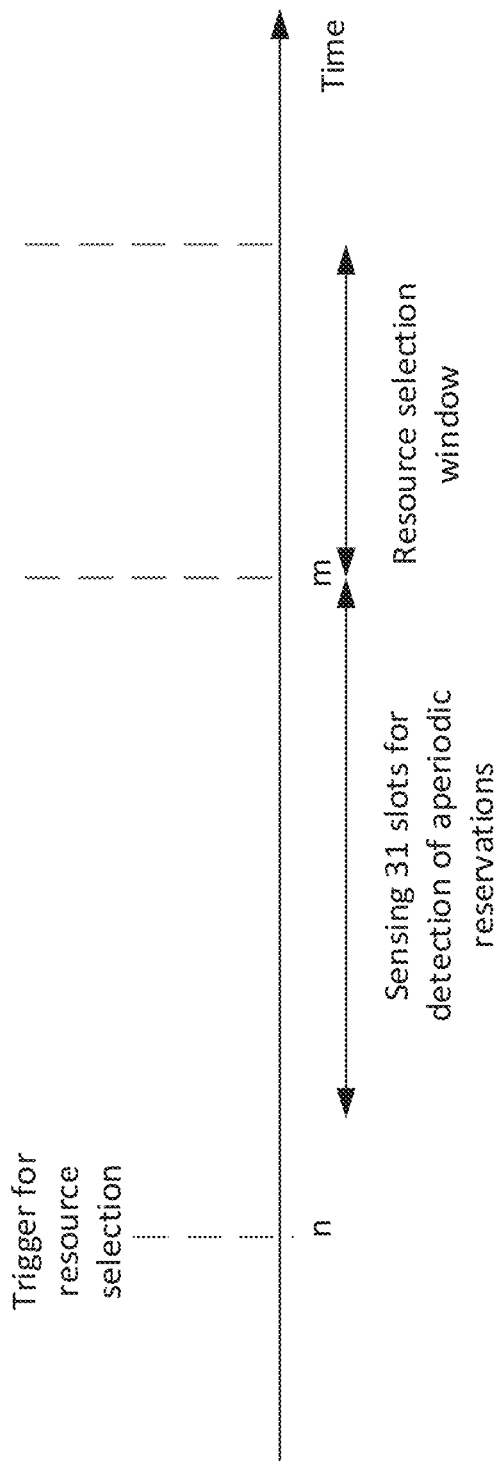
FIG. 7 illustrates an example of a mandated sensing duration, according to an embodiment.

FIG. 7 illustrates an example of a mandated sensing duration, according to an embodiment.

Referring to FIG. 7, a power-limited UE is required to perform sensing for a duration 31 slots before attempting to access the subchannels in order to detect aperiodic traffic. While the signaling window itself is 32 slots, because the current slot is counted in the signaling window, the power-limited UE is required to perform sensing for a duration 31 slots. That is, with a 32 signaling window resources can be indicated that are at most 31 slots away in the future. Hence, the UE is required to sense only 31 slots as any slot before that cannot indicate resources within the resource selection window.

Restriction on Accessible BWP by PUEs for Collision Reduction

Power-limited UEs, e.g., those with low priority traffic, may be restricted to a subset of the available resources in order to avoid collisions with higher priority traffic. In this case, once a UE with a limited power budget wakes up, it attempts to access a subset of the system's subchannels. The number of subchannels within this subset may depend on the traffic priority.

For resource selection on this subset, two approaches are considered. In the first approach, no sensing is involved and the UE randomly select a resource for transmission. In the second approach, the UE can perform partial sensing on the limited subset (i.e., reduced bandwidth) in order to preserve power and select the resources for transmission. This sensing can be required to be continuous or to be only for limited duration before transmission. This duration can also depend on the traffic priority and the PDB.

In accordance with an embodiment of the disclosure, a UE with a limited power budget may perform transmissions on randomly selected resources or resources selected based on partial sensing. These resources are selected from a specific subset, whereby the number of subchannels within this subset depends on the traffic priority.

Figure 8:
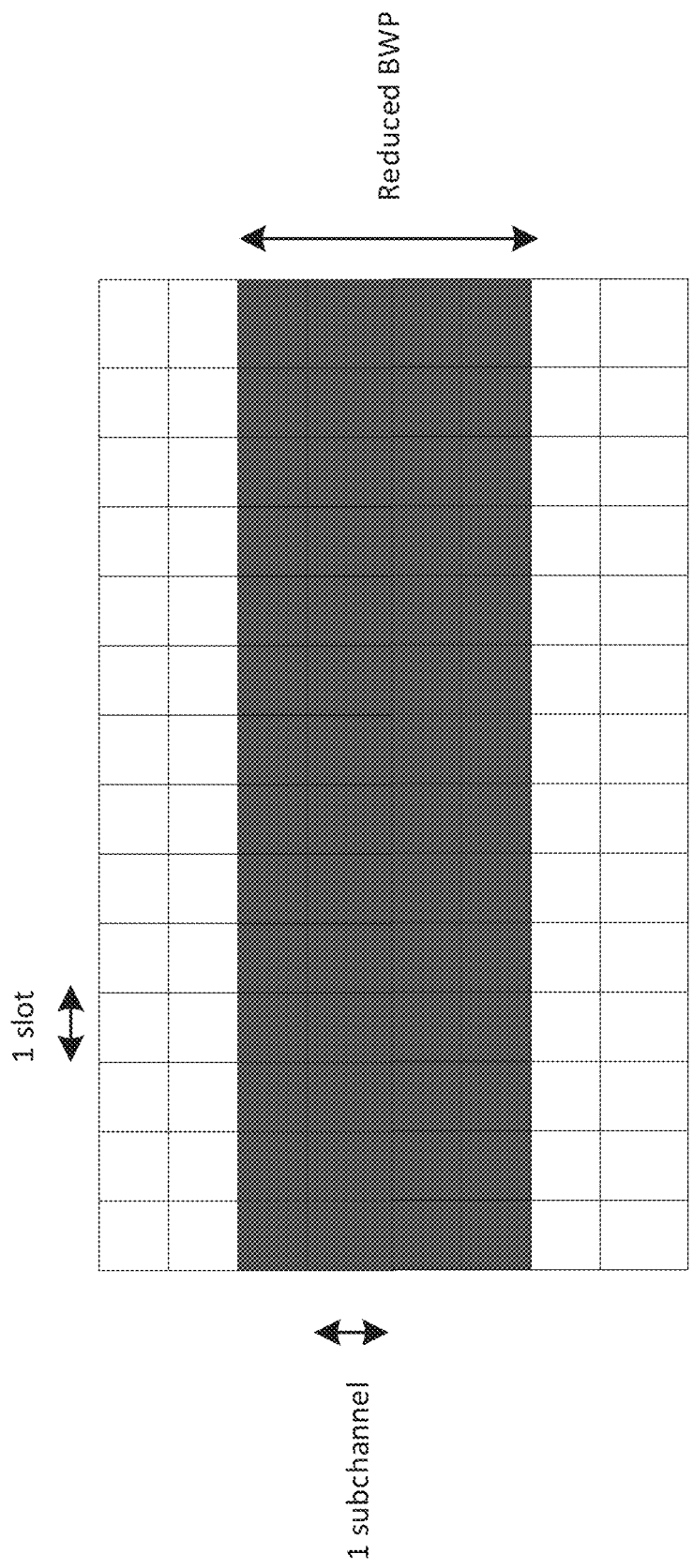
FIG. 8 illustrates an example of reduced accessible/monitored BWP for power saving and collisions reduction, according to an embodiment.

FIG. 8 illustrates an example of reduced accessible/monitored BWP for power saving and collisions reduction, according to an embodiment.

Referring to FIG. 8, a UE is restricted to accessing/monitoring a subset of the available resources, e.g., a reduced BWP of only 4 subchannels.

Figure 9:
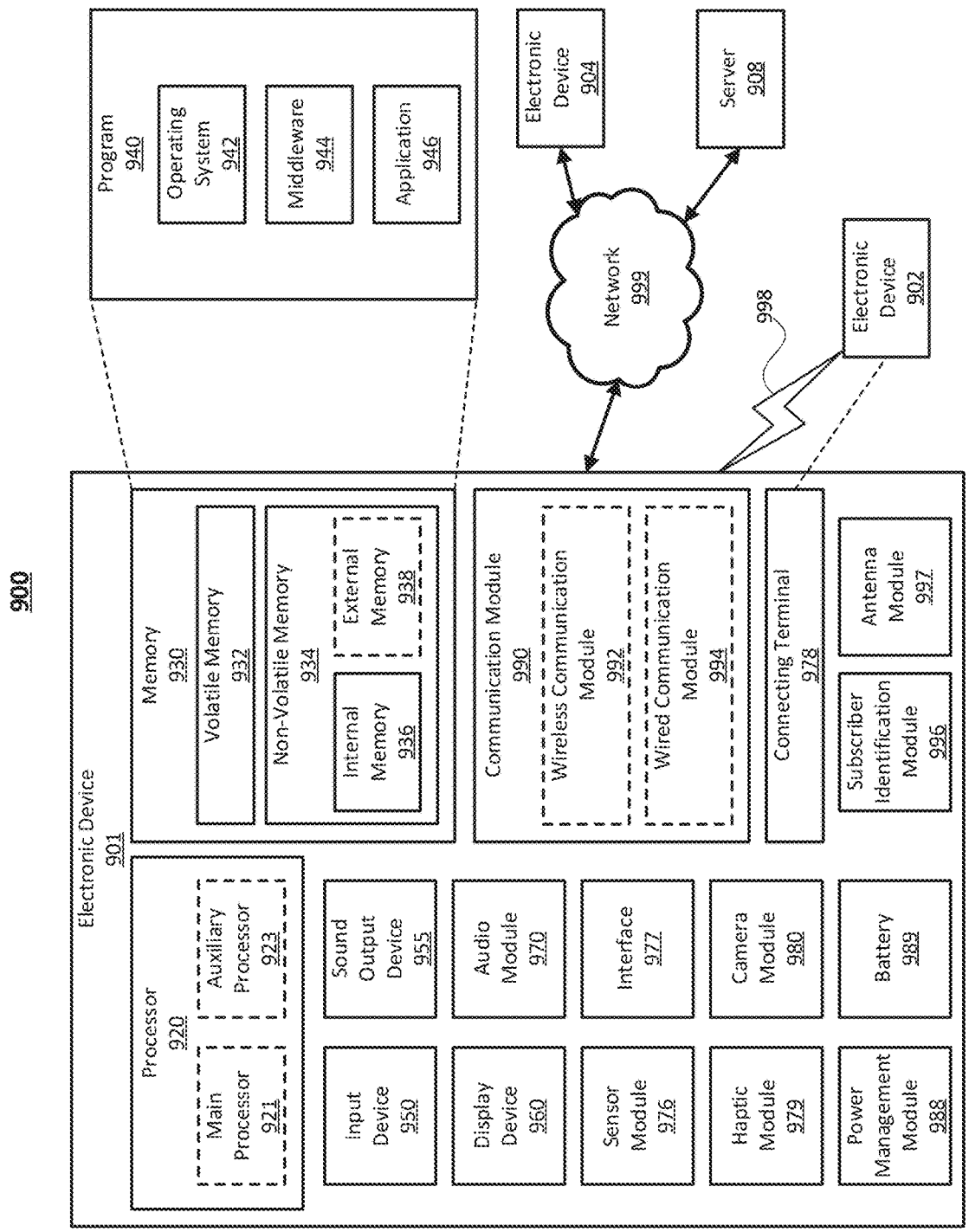
FIG. 9 illustrates an electronic device in a network environment, according to an embodiment.

FIG. 9 illustrates an electronic device in a network environment, according to an embodiment.

Referring to FIG. 9, the electronic device 901, e.g., a mobile terminal including GPS functionality, in the network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997 including a GNSS antenna. In one embodiment, at least one (e.g., the display device 960 or the camera module 980) of the components may be omitted from the electronic device 901, or one or more other components may be added to the electronic device 901. In one embodiment, some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute, for example, software (e.g., a program 940) to control at least one other component (e.g., a hardware or a software component) of the electronic device 901 coupled with the processor 920, and may perform various data processing or computations. As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor, and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to one embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to one embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to one embodiment, the audio module 970 may obtain the sound via the input device 950, or output the sound via the sound output device 955 or a headphone of an external electronic device 902 directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wiredly) or wirelessly. According to one embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. According to one embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. According to one embodiment, the haptic module 979 may include, for example, a motor, a piezoelectric element, or an electrical stimulator.

The camera module 980 may capture a still image or moving images. According to one embodiment, the camera module 980 may include one or more lenses, image sensors, image signal processors, or flashes.

The power management module 988 may manage power supplied to the electronic device 901. The power management module 988 may be implemented as at least part of, for example, a power management integrated circuit (PMIC).

The battery 989 may supply power to at least one component of the electronic device 901. According to one embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor) and supports a direct (e.g., wired) communication or a wireless communication. According to one embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to one embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

One embodiment may be implemented as software (e.g., the program 940) including one or more instructions that are stored in a storage medium (e.g., internal memory 936 or external memory 938) that is readable by a machine (e.g., the electronic device 901). For example, a processor of the electronic device 901 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

As described above, the embodiments of the disclosure:
1) Allow PUEs to perform their initial transmission on a limited number of subchannels thereby reducing their chances of collisions;
2) Reduce the chances of pre-emption for PUEs by SCI indication, thereby reducing the power used for sensing associated with resource selection;
3) Reduce the delay for power saving UE by reducing the chances of pre-emption;
4) Reduce the sensing burden on PUEs by reducing their monitored duration for pre-emption;
5) Reduce the collisions between partial sensing UEs and aperiodic traffic reservations of their neighbors by mandating a sensing duration before transmission; and
6) Preserve the power of PUEs by requiring them to monitor and use only a subset of the available BWP.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A user equipment (UE) apparatus, the UE apparatus comprising:
   a transceiver; and
   a processor configured to:
      identify a number of periodic sensing windows,
      monitor for periodic traffic in the periodic sensing windows,
      identify an aperiodic sensing window and a resource selection window,
      monitor for sidelink control information (SCI) transmitted by neighbor UEs in the aperiodic sensing window,
      monitor for aperiodic traffic in the aperiodic sensing window,
      determine a resource for transmitting data in the resource selection window, and
      transmit, via the transceiver, data using the determined resource,
   wherein the aperiodic sensing window includes a mandated sensing duration for detection of the aperiodic traffic prior to transmission by the transceiver,
   wherein the mandated sensing duration is included within and shorter than the aperiodic sensing window, and
   wherein the mandated sensing duration is at least equal to a signaling window of the UE before an initial transmission, in response to a packet delay budget (PDB) being greater than or equal to the signaling window of the UE.

2. The UE apparatus of claim 1, wherein the processor is further configured to monitor for the SCI over a reduced bandwidth part (BWP) of available resources in the aperiodic sensing window.

3. The UE apparatus of claim 2, wherein the processor is further configured to determine the reduced BWP based on the traffic priority of the data.

4. The UE apparatus of claim 2, wherein the processor is further configured to determine the reduced BWP based on the PDB.

5. The UE apparatus of claim 1, wherein the processor is further configured to determine the resource for transmitting the data by randomly selecting the resource from a reduced bandwidth part (BWP) of available resources.

6. The UE apparatus of claim 5, wherein the processor is further configured to determine the reduced BWP based on the traffic priority of the data.

7. The UE apparatus of claim 5, wherein the processor is further configured to determine the reduced BWP based the PDB.

8. The UE apparatus of claim 1, wherein the processor is further configured to determine the resource for transmitting the data by reserving a first number of subchannels for an initial transmission and reserving a second number of subchannels for each subsequent transmission, wherein the first number of subchannels is less than the second number of subchannels.

9. The UE apparatus of claim 8, wherein the processor is further configured to transmit SCI including an indication of a use of the second number of subchannels.

10. The UE apparatus of claim 9, wherein the indication includes a flag indicating a difference between the first number of subchannels and the second number of subchannels.

11. The UE apparatus of claim 9, wherein a time between the initial transmission and a first subsequent transmission is greater than or equal to T, where T is a minimum time required to process a reselection or pre-emption request.

12. The UE apparatus of claim 1, wherein the processor is further configured to transmit an indication of being a power limited UE in SCI to the neighboring UEs, and
wherein the indication is utilized by a UE among the neighboring UEs to avoid pre-empting the UE apparatus and perform resource re-selection.

13. The UE apparatus of claim 1, wherein the processor is further configured to perform periodic reservation of at least two resources.

14. The UE apparatus of claim 13, wherein the processor is further configured to:
monitor for the SCI in a first reserved resource, and
determine a second reserved resource as the resource for transmitting the data.

15. The UE apparatus of claim 14, wherein the processor is further configured to not transmit the data using the second reserved resource, in response to receiving SCI from a neighboring UE indicating that the second reserved resource is already reserved by the neighboring UE.

16. The UE apparatus of claim 14, wherein the processor is further configured to:
relinquish the second reserved resource, and
reserve a new resource for transmitting the data.

17. The UE apparatus of claim 13, wherein a time between the at least two resources is greater than or equal to T, where T is a minimum time required to process a reselection or pre-emption request.

18. The UE apparatus of claim 1, wherein the processor is further configured to determine the resource for transmitting the data by selecting the resource from a reduced bandwidth part (BWP) of available resources based on partial sensing.

19. The UE apparatus of claim 1, wherein the processor is further configured to modify the mandated sensing duration based on a traffic priority of the data.

20. A user equipment (UE) apparatus, the UE apparatus comprising:
a transceiver; and
a processor configured to:
identify a sensing window and a resource selection window,
monitor for sidelink control information (SCI) transmitted by neighbor UEs in the sensing window,
determine a resource for transmitting data in the resource selection window, and
transmit, via the transceiver, data using the determined resource,
wherein the sensing window includes a mandated sensing duration for detection of aperiodic traffic prior to transmission by the transceiver,
wherein the mandated sensing duration is based on a packet delay budget (PDB), and is included within and shorter than the sensing window, and
wherein the mandated sensing duration is at least equal to a signaling window of the UE before an initial transmission, in response to a PDB being greater than or equal to the signaling window of the UE.

* * * * *